No. 780,001. Patented January 10, 1905.

UNITED STATES PATENT OFFICE.

WILLIAM A. HALL, OF BELLOWS FALLS, VERMONT, ASSIGNOR TO CASEIN COMPANY OF AMERICA, A CORPORATION OF NEW JERSEY.

PAINT AND PROCESS OF PRODUCING SAME.

SPECIFICATION forming part of Letters Patent No. 780,001, dated January 10, 1905.

Application filed January 19, 1903. Serial No. 139,615.

*To all whom it may concern:*

Be it known that I, WILLIAM A. HALL, a citizen of the United States, residing at Bellows Falls, in the county of Windham and State of Vermont, have invented or discovered certain new and useful Improvements in Paints or Enameling Compositions and Processes of Producing Same, of which the following is a specification.

Silicate of soda or "water-glass" has heretofore been tried as a binder in paints; but it has not proved satisfactory for this purpose for the reason that when thoroughly dried it becomes extremely hard and brittle, so that it is not sufficiently tenacious, and the paints when dry are liable to crack and then peel up or scale off at the edges of the cracks. I have discovered, however, that this brittleness of the soluble or water-glass may be overcome by combining therewith a suitable proportion of asbestos in a comminuted form, and by thoroughly stirring or agitating the mixture the asbestos apparently dissolves and entirely disappears as a fiber and gives to the mixture quite a different character, so that when dried it has considerable toughness and flexibility, thus rendering it especially useful as a binding material in paints, either oil-paints or water-paints, kalsomines, &c.

Asbestos fiber possesses the characteristic of indefinite subdivision, in that each apparent fiber is composed of a multitude of other fibers, the division of which can be carried on indefinitely, and my discovery has developed the fact that when asbestos fiber is mixed with silicate of soda by a thorough agitation it becomes so infinitely subdivided that it is apparently (although not really) dissolved and is in such a state of minute subdivision that it is held in suspension, so as to present all of the ordinary characteristics of a solution, and the only apparent change in the silicate of soda is a considerable thickening thereof without any appearance of the asbestos fiber.

The minutely-subdivided asbestos held in suspension in the silicate of soda, as above stated, does not separate or settle, and the product can be kept in a liquid state indefinitely and is always ready for use. One particular use to which this silicate of soda and asbestos compound is well adapted is, as above stated, as a binding material in paints or enameling compositions which may and preferably will contain a suitable quantity of an earthy or mineral base—such as whiting, talc, &c.—to give the paint the proper body or consistency, and the paint may also contain, in addition to the earthy or mineral base and the silicate of soda and asbestos compound, any suitable pigment or coloring material and will also preferably comprise a small percentage of resin-oil or other vegetable oil, which when added to the other ingredients saponifies slightly and mixes completely. The asbestos seems to give to the water-glass or silicate of soda a sort of felting characteristic, so that the same is to a considerable extent tough or tenacious instead of having the characteristics of the silicate of soda or water-glass without the asbestos, while the oil, which will for some purposes preferably be added to the other ingredients in making a paint or enameling composition, still further increases the tenacity or elasticity and strength of the compound when applied as a paint.

The proportion of asbestos fiber to be combined with the silicate of soda or water-glass to produce a desirable binding material for paints or enameling compositions will be about ten parts, by weight, of asbestos to ninety parts of the silicate of soda, although these proportions may be widely varied, according to the purpose for which the paints are to be used. These paints or enameling compositions will preferably contain for each one hundred parts of the silicate of soda and asbestos compound about two hundred parts of an earthy or mineral base, consisting of whiting, talc, or their equivalents, preferably in powdered form, and about one hundred parts of water. Where oil is to be used as an ingredient of the paint, about fifteen parts of resin-oil or other oil may be added to each one hundred parts of the silicate of soda and asbestos compound. These proportions, however, (all of which may be understood as being by weight,) may be varied considerably without departing from the spirit of the invention or discovery.

The improved paint or enameling composition above described is particularly well adapted as a coating, or enameling compound for iron manufactures or other articles where an enameling of a hard though tough or tenacious and durable character is desired.

Having thus described my invention or discovery, I claim and desire to secure by Letters Patent—

1. A liquid paint or enameling composition consisting of, approximately, ninety parts silicate of soda or water-glass, ten parts asbestos in a minutely-subdivided condition, two hundred parts of a powdered earthy or mineral base, as talc or whiting, fifteen parts of a vegetable oil, and one hundred parts of water.

2. The herein-described process for producing a paint or enameling composition, consisting in mixing with about ninety parts of silicate of soda or water-glass about ten parts of asbestos and thoroughly incorporating the ingredients together and minutely subdividing the asbestos fiber in the liquid mixture, by agitation, then adding to the liquid mixture of silicate of soda or water-glass and asbestos about two hundred parts of an earthy or mineral base, in powdered form.

3. The herein-described process for producing a paint or enameling composition, consisting in mixing with about ninety parts silicate of soda or water-glass about ten parts of asbestos and thoroughly incorporating the ingredients together and minutely subdividing the asbestos fiber in the liquid mixture, by agitation, then adding to the liquid mixture of silicate of soda or water-glass and asbestos about two hundred parts of an earthy or mineral base, in powdered form, and about fifteen parts of a vegetable oil.

In testimony whereof I affix my signature in presence of two witnesses.

WILLIAM A. HALL.

Witnesses:
A. B. ROMEN,
FLORENCE J. WALSH.